United States Patent [19]

Antonen et al.

[11] Patent Number: 4,785,041
[45] Date of Patent: Nov. 15, 1988

[54] SCREEN PRINTABLE ORGANOSILOXANE RESIN COATING COMPOSITIONS

[75] Inventors: Robert C. Antonen, San Ramon; Diane M. Rasch, Alameda, both of Calif.; David A. Sierawski; David J. Romenesko, both of Midland, Mich.

[73] Assignee: Dow Corning Corporation, Midland, Mich.

[21] Appl. No.: 140,265

[22] Filed: Dec. 31, 1987

[51] Int. Cl.$^4$ .................................................. C08K 5/24
[52] U.S. Cl. ...................................... 524/265; 524/266; 524/267; 524/268; 524/366; 524/284; 524/378; 524/315; 524/317; 524/320; 524/731; 524/760; 528/14; 528/19
[58] Field of Search ............... 524/366, 284, 378, 315, 524/317, 320, 731, 760, 265, 266, 267, 268; 528/14, 19

[56] References Cited

U.S. PATENT DOCUMENTS

| | | | |
|---|---|---|---|
| 4,248,750 | 2/1981 | Murakami et al. | 528/15 |
| 4,395,443 | 7/1983 | Shimizu et al. | 427/387 |
| 4,413,088 | 11/1983 | Frye | 524/858 |
| 4,477,626 | 10/1984 | Suzuki | 524/862 |

FOREIGN PATENT DOCUMENTS 921046  9/1959  United Kingdom .

Primary Examiner—Melvyn I. Marquis
Attorney, Agent, or Firm—Robert Spector

[57] ABSTRACT

Thixotropic, silica-filled coating compositions wherein the curable film-forming material is an organosiloxane copolymer resin include a liquid polydiorganosiloxane containing hydroxyl-terminated polyoxypropylene units as the flow control agent. The compositions are particularly useful as screen printable passivation coatings for semiconductor devices.

4 Claims, No Drawings

SCREEN PRINTABLE ORGANOSILOXANE RESIN COATING COMPOSITIONS

BACKGROUND OF THE INVENTION

1. Field of the Invention

This invention relates to organosiloxane coating compositions. More particularly, this invention relates to thixotropic coating compositions wherein the film-forming material is a polyorganosiloxane that can be applied to selected areas of a substrate, particularly wafers of processed silicon, by screen printing.

2. Description of the Prior Art

The physical and electrical properties of polyorganosiloxanes comprising methyl- and phenyl substituted siloxane units make these materials desirable as passivation coatings for semiconductor devices such as transistors and integrated circuits. The coating are typically applied to selected areas of processed silicon wafers that are subsequently subdivided into a plurality of semiconductor devices. Once applied the coating must not flow beyond its initial borders to cover bonding pads or sites where test probes are subsequently placed in electrical contact with the device to measure its electrical properties.

Screen printing is a convenient means for applying passivation coatings to the etched silicon wafer. The coating composition must flow readily through the openings in the screen under the relatively low pressure applied by the squeegee or other device used to force the composition through the pattern of openings in the screen. The composition should adhere sufficiently to the surface of the wafer without becoming so "tacky" that it also adheres to the screen.

Coating compositions containing organosiloxane resins wherein silicon is bonded to hydrocarbon radicals including methyl and phenyl are known in the art. The compositions typically include the resin, a solvent for the resin and a filler such as silica. The composition may also include additives modify the properties of the coating composition or the cured resin.

Compositions containing resins with silicon-bonded hydroxyl and/or alkoxy groups in combination with organosilicon compounds containing functional groups such as alkoxy or silicon bonded hydrogen that are reactive with the groups present on the resin are disclosed in British Pat. No. 921,046, which issued on Mar. 13, 1963.

U.S. Pat. No. 4,395,443, which issued to Shimizu and Hosokowa on July 26, 1983 teaches film-forming compositions containing a resinous organosiloxane copolymer consisting essentially of $R_3SiO_{0.5}$ and $SiO_2$ units, where R represents a monovalent hydrocarbon radical, in combination with from 20 to 200 parts by weight per 100 parts of said resin of a hydroxyl terminated polydiorganosiloxane having a viscosity of from 10 to 2000 Pa.s at 25° C. and a mixed organsiloxane/organic solvent.

U.S. Pat. No. 4,248,750, which issued to Murakami et al. on Feb. 3, 1981 discloses peelable films formed by reacting a vinyl-substituted polyorganosiloxane with a polyorganohydrogensiloxane. An alcohol- or polyether-modified polydiorganosiloxane is used to reduce the tendency of the material to accumulate static electricity and to improve the ability of the cured film to be coated with an adhesive.

Because of their tendency to flow after being applied, coating compositions comprising a solubilized organosiloxane copolymer containing units of the general formulae $RSiO_{1.5}$ and $R_2SiO$ where R represents a monovalent hydrocarbon radical, preferably a combination of methyl and phenyl radicals, and a silica filler typically cannot be used to apply screen printed coatings to selected area of semiconductor devices that border on bonding pad and test probe areas, which must remain free of coating.

U.S. Pat. No. 4,413,088, which issued to Frye on Nov. 1, 1983 discloses abrasion resistant coatings comprising (1) a dispersion of colloidal silica in a solubilized partial condensate of $RSi(OH)_3$, where at least 70 percent of the monovalent hydrocarbon radicals represented by R are methyl and, (2) as a flow control agent, from 2.5 to 15 percent, based on the weight of the composition, of a specified class of polysiloxane/polyether copolymers of the general formula

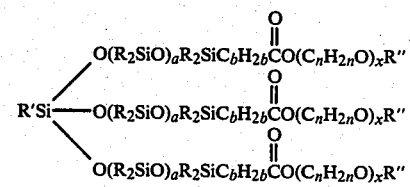

where R and R' are monovalent hydrocarbon radicals; R" is lower alkyl, a has a value of at least 2, b has a value of 2 or 3, n has a value of 2, 3 or 4 and the value of x is at least 5. These copolymers function as flow control agents.

U.S. Pat. No. 4,477,626, which issued to Suzuki on Oct. 16, 1984 discloses thixotropic compositions comprising a vinyl-containing polyorganosiloxane. an organohydrogensiloxane containing at least two silicon bonded- hydrogen atoms per molecule and a platinum-containing hydrosilylation catalyst. The material responsible for the thixotropic character of the composition is a polyorganosiloxane containing at least 0.5 weight percent of hydroxyl groups that can be present as silanol groups or as silicon-bonded hydroxyalkyl groups, including polyoxyethylene and polyoxypropylene groups. Exemplified thixotropic agents include a hydroxyl-terminated polydimethylsiloxane containing an average of eight dimethylsiloxane units per molecule, a trimethylsiloxy-terminated dimethylsiloxane/3-hydroxypropylmethylsiloxane copolymer containing an average of fifty dimethylsiloxane units and seven 3-hydroxypropylmethylsiloxane units per molecule, and a trimethylsiloxy-terminated copolymer containing an average of thirty dimethylsiloxane units and three units of the formula

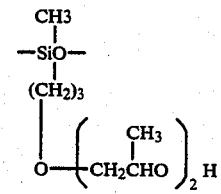

per molecule.

The present inventors evaluated a number of hydroxyl-containing copolymers of the types disclosed in the aforementioned Frye and Suzuki patents and determined that many were unsuitable for one or more reasons.

One objective of this invention is to provide additives that impart thixotropic flow properties to silica-filled solubilized organosiloxane compositions without adversely affecting the ability of these materials to function as high resolution, screen printable compositions.

A second objective of this invention is to provide organosiloxane compositions capable of being screen printed onto a variety of substrates, particularly the silicon wafers used to fabricate semiconductor devices, without adversely affecting the electrical properties of these devices.

SUMMARY OF THE INVENTION

The objectives of this invention are achieved by including a specified class of liquid polydiorganosiloxanes containing hydroxyl-terminated polyoxypropylene units in curable silica-filled coating compositions containing as the curable material a solubilized, organosiloxane copolymer wherein the hydrocarbon radicals bonded to silicon are methyl and phenyl.

DETAILED DESCRIPTION OF THE INVENTION

This invention provides a thixotropic, screen printable coating composition comprising A. 100 parts by weight of a solubilized curable organosiloxane copolymer comprising methyl-substituted siloxane units, phenyl-substituted siloxane units and silanol groups, where said copolymer has a degree of substitution of at least 1.3;

B. from 3 to 20 parts by weight of a finely divided silica filler;

C. as the thixotropic agent, from 1 to 6 parts by weight of a liquid organosiloxane copolymer represented by the average general formula

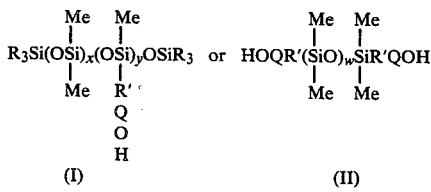

(I)    (II)

where Me represents methyl; R represents at least one member selected from the group consisting of an alkyl radical containing from 1 to 10 carbon atoms, a halogenated alkyl radical containing from 1 to 10 carbon atoms and a phenyl radical; R' represents an alkylene radical containing from 3 to 10 carbon atoms, Q represents $-[OCH_2CH(CH_3)]_z-$, x is zero or a positive integer, w and y are at least 1; neither the value of w nor the sum of x and y exceed the value beyond which said copolymer is a solid at 25° C., the units containing a Q substituent constitute from 2 to 80 percent of the total number of units in said copolymer and the value of z is from 2 to 30, inclusive;

D. an amount of a silanol condensation catalyst sufficient to cure said composition, and E. from 10 to 30 parts by weight of solvent that is compatible with said composition and boils at a temperature of from 180° to 300° C.

The inventive feature of the present compositions resides in the presence of the liquid organosiloxane copolymer, referred to hereinafter as ingredient C. Copolymers of this type have been reported in the literature pertaining to organosilicon compounds. One class of copolymers, represented by Formula I, can be considered polydimethylsiloxanes wherein one of the methyl radicals on at least 2 percent of the non-terminal silicon atoms has been replaced by a group of the formula —R'QOH, where R' and Q are defined hereinbefore.

The second type of copolymer suitable for use as ingredient C is an ABA type of copolymer represented by the foregoing Formula II. In this type of copolymer the A portion contains the polyoxypropylene residues represented by Q and the B portion consists essentially of —Me$_2$SiO— units.

Methods for preparing both types of liquid copolymers suitable for use as Ingredient C are disclosed in the prior art. The copolymers of Formula I can be prepared by reacting a dimethylsiloxane/methylhydrogensiloxane copolymer of the general formula

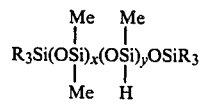

with at least an equimolar amount, based on the number of silicon bonded hydrogen atoms, of a half ether of a polyoxypropylene glycol derived from an ethylenically unsaturated alcohol such as allyl alcohol. The ethylenically unsaturated alcohol contains from 3 to 10 carbon atoms and the polyoxypropylene glycol can have from 2 to 30 or more repeating units. Preferably the number of these repeating units is from 2 to 10, most preferably from 2 to 5.

Copolymers corresponding to Formula II can be prepared by reacting a dimethylhydrogensiloxy-terminated polydimethylsiloxane of the formula

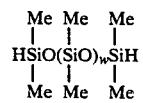

with the aforementioned monoether of a polyoxypropylene glycol and an ethylenically unsaturated alcohol.

Methods for preparing dimethylsiloxane/methylhydrogensiloxane copolymers are sufficiently well known that a detailed discussion of methods for preparing these compounds is not required in this specification.

The average number of repeating siloxane units in copolymers corresponding to either Formula I or Formula II, represented respectively by the sum of x and y and by the value of w, is preferably between 5 and 100.

The three R radicals located at the two terminal positions of the copolymer represented by Formula I can be identical or different, and are selected from alkyl containing from one to ten carbon atoms, halogenated alkyl containing from one to ten carbon atoms and phenyl radicals. Preferably at least 50 percent of the R radicals are methyl and any remaining ones are phenyl and/or 3,3,3-trifluoropropyl, based on the availability of the intermediates used to prepare ingredient C. Most preferably all of the R radicals are methyl.

It is believed that the activity of ingredient C as a flow control agent is directly proportional to the concentration of polyoxypropylene glycol residues in the copolymer, which are represented by Q in the foregoing formulae. Repeating or terminal units containing these residues should constitute from 2 to about 80 percent of the total number of repeating and terminal units in either embodiment of ingredient C. When this value is less than 2 percent the concentration of ingredient C required to achieve a desired level of thixotropy may adversely affect other properties of the curable composition. On the other hand, when the concentration of Q-containing units exceeds about 80 percent of the total number of repeating and terminal units in ingredient C, this ingredient may not be compatible with the resin and other ingredients of the present compositions, and the composition will not flow readily through the openings of the printing screen on to the substrate. Preferably Q-containing units constitute from 3 to 70 mole percent of the total number of repeating and terminal units in ingredient C.

To achieve the desired flow characteristics in the curable compositions of this invention the concentration of ingredient C should constitute from 1 to 6 parts by weight per 100 parts of the organosiloxane resin referred to hereinafter as ingredient A. Less than 1 part by weight of ingredient C will not modify the flow properties of the composition to any significant extent. No improvement in the thixotropic flow properties of the composition is observed when the concentration of ingredient C exceeds about 6 parts by weight. In preferred compositions the concentration of ingredient C is from 2 to 4 parts by weight per 100 parts of organosiloxane resin.

It should be understood that the concentration of ingredient C required to achieve a given level of thixotropy will usually be inversely proportional to the concentration of polyoxypropylene glycol units in this ingredient and the solids content of the composition.

The curable organosiloxane copolymer that constitutes the major reactive ingredient of the present compositions contains methyl-substituted siloxane units and phenyl-substituted siloxane units in addition to silanol groups.

To achieve an optimum combination of physical properties, including hardness, toughness and abrasion resistance, in the cured coating at temperatures from 10° to 50° C. or higher the copolymer is preferably a resin containing at least 20 mole percent of dimethylsiloxane units and/or phenylmethylsiloxane and from 20 to about 40 mole percent of mono- or diphenylsiloxane units or a combination thereof, with any remainder being monomethylsiloxane units. Preferably from 15 to about 25 percent of the phenyl-containing siloxane units are diphenylsiloxane units.

The average number of hydrocarbon radicals per silicon atom, also referred to as the degree of substitution, is at least 1.3, and typically from about 1.3 to 1.6, depending upon the desired hardness of the cured copolymer.

To allow for sufficient curing to develop useful levels of strength it is desirable to have at least 0.5 weight percent of unreacted silanol groups in the copolymer. Preferably the copolymer is a uncondensed hydrolyzate and the silanol content is typically from 1 to about 3 weight percent. The copolymer is cured by heating it in the presence of a silanol condensation catalyst.

Organosiloxane copolymers suitable for use in the present compositions can be prepared by hydrolyzing mixtures of the corresponding methylchlorosilanes and phenylchlorosilanes. The general method for hydrolyzing chlorosilanes is well known and can be conducted in the presence of various catalysts, water-miscible alcohols and water-immiscible liquid hydrocarbons such as xylene that are solvents for the resultant copolymer.

The number of moles of water present in the hydrolysis reaction mixture is typically at least equal to the number of moles of chlorine atoms on the silanes, and is inversely proportional to the desired molecular weight of the copolymer. During hydrolysis the chlorine atoms are replaced by hydroxyl groups. A portion of these silicon-bonded hydroxyl groups are condensed to form siloxane bonds.

The hydrogen chloride produced as a by-product of the hydrolysis reaction is preferably removed either by neutralization or distillation during the hydrolysis. Alternatively the acid can be diluted by the addition of water.

It is known to further condense or "body" resinous organosiloxane copolymers by heating them in the presence of a suitable condensation catalyst such as an alkali metal hydroxide or silanolate or a group II metal salt of a carboxylic acid such as zinc octoate. During this reaction a water-soluble alcohol can be added to replace at least a portion of the hydroxyl groups with alkoxy groups.

The organosiloxane copolymers used in the present compositions are solid materials at ambient temperature, and are isolated from the hydrolysis reaction mixture as a solution in a water-immiscible organic liquid such as xylene that is present in the reaction mixture.

In a typical hydrolysis reaction a mixture containing dimethyldichlorosilane, methyltrichlorosilane, phenyltrichlorosilane and diphenyldichlorosilane is added to a mixture of water, a water-soluble alcohol and a water-immiscible solvent for the partially condensed resinous copolymer. The by-product hydrogen chloride is removed together with the alcohol during the hydrolysis, and the unreacted water is removed by azeotropic distillation together with the water-immiscible solvent following completion of the hydrolysis reaction.

If the solvent in which the preferred resinous copolymers are prepared is not the one used for the composition of this invention, it is preferable to remove the solvent from the hydrolyzate without condensation or "bodying" of the copolymer, which requires addition of a silanol condensation catalyst. The silanol content of the hydrolyzate is typically within the present preferred limits of from 1 to 3 weight percent. The reason for this preference is the tendency of bodied resinous siloxane copolymers to gel in the presence of the condensation catalyst when the solubilized resin is heated to remove the original solvent.

The present compositions contain from 5 to 20 parts by weight per 100 parts of ingredient A, of a finely divided silica. Useful silicas exhibit a surface area of at least 50 square meters per gram, and include fume and precipitated silicas. It is believed that an interaction between the silica and the thixotropic agent, ingredient C is responsible for the flow properties of a given composition. The concentration of silica that yields the desired flow properties in combination with ingredient C will generally be a function of the type and concentration of organosiloxane resin. Compositions containing more than about 20 parts by weight of silica per 100 parts of ingredient A are typically too viscous for use as screen printing compositions.

The present compositions also include a curing catalyst for the organosiloxane copolymer. Useful catalysts include those used for silanol condensations, and are discussed hereinabove. Preferred catalysts include but are not limited Group II metal salts of carboxylic acids, such as zinc octoate, and quaternary ammonium salts. The concentration of catalyst required to effect curing of the copolymer at temperatures of from 100° to about 200° C. is typically from 0.01 to 1 part by weight per 100 parts by weight of the curable composition.

Because the organosiloxane copolymer, referred to as ingredient A, is a solid at ambient temperature, the coating compositions of this invention also include a solvent in a sufficient amount to dissolve both the copolymer and the thixotropic agent, ingredient C and achieve the desired viscosity level. The volatility of the solvent must be sufficiently low that it does not evaporate during application of the coating composition to the extent that the composition becomes sufficiently "tacky" to adhere to the screen used to apply the coating. Liquid hydrocarbons such as xylene may be too volatile for some applications. To achieve the desired evaporation rate under typical coating conditions the boiling point of the solvent should be from 180° to 300° C.

Preferred solvents for the present compositions include mono- and diethers and mixed ether-esters of glycols such as the lower alkyl ethers of ethylene glycol and diethylene glycol. A particularly preferred solvent is the acetic acid ester of the monobutyl ether of diethylene glycol.

In addition to the organosiloxane copolymer, thixotropic agent, curing catalyst and solvent the present compositions can also include pigments, stabilizers to inhibit degradation of the cured coating in the presence of heat and/or ultra-violet light, treating agents for the filler and additives to modify the physical properties of the cured coating.

The present compositions are prepared by blending the ingredients to homogeniety in a suitable mixer. Examples of suitable mixers include dough and paddle type mixers. mechanically operated stirring blades of various configurations, and roller mills used to formulate paints and other coating compositions. The particular equipment selected will be determined by the consistency of the composition.

The following examples describe preferred embodiments of the present thixotropic screen printable compositions, and should not be interpreted as limiting the scope of the present invention as defined in the accompanying claims. Unless otherwise specified all parts and percentages are by weight and all viscosities were measured at 25° C.

EXAMPLE 1

A composition of this invention was prepared by blending the following ingredients using an air powered mixer followed by three passes through a three-roll mill.
100 parts of a solid organosiloxane resin prepared by hydrolyzing a mixture containing 15 mole percent of methyltrichlorosilane, 40 mole percent of dimethyldichlorosilane, 35 mole percent of phenyltrichlorosilane and 10 mole percent of diphenyldichlorosilane;
10.2 parts of a fume silica having a nominal surface area of 250 m² per gram;
2.9 parts of a thixotropic agent (C1) consisting essentially of a trimethylsiloxy terminated organosiloxane copolymer containing an average of 70 dimethylsiloxane units and 3 units of the formula

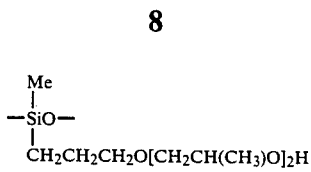

0.3 part of lampblack
0.45 part of zinc octoate as a condensation catalyst, and
16.2 parts of 2-(2-butoxyethoxy)ethyl acetate as a solvent.

When the resultant composition was freed of entrapped air under reduced pressure it had the consistency of a thick paste.

Evaluation Procedure A

The thixotropy of the deaired composition was evaluated by applying the composition as a coating on to one surface of a 12 cm.-diameter circular wafer formed from semiconductor grade silicon. The coating was applied through a 200 mesh screen that was coated in selected areas with a cured organic emulsion to define a pattern of squares measuring 7.5 mm along each side. The coating was 0.08 mm. thick. Each of the squares contained three rectangular areas that were free of coating. Two of these were bonding pad areas measuring 1.0 by 1.3 mm. and located in the 2 non-adjacent corners of each square. The third area was a test probe area located in the center of the square.

The coating composition was forced through the open areas of the screen by drawing a squeegee blade across the screen at a rate of about 90 cm. per minute. The squeegee blade was formed from a silicone rubber having a durometer hardness value of 70 on the Shore A scale. The screen was then removed to reveal the desired pattern of coated areas on the silicon wafer.

The material that transferred to the surface of the silicon wafer was allowed to remain undisturbed for 15 minutes under ambient conditions, at which time the bonding and test pad areas were still free of coating material. The coating was then cured by heating the silicon wafer for one hour at 125° C., followed by one hour at 190° C. and one hour at 250° C. The dimensions of the coated area did not change significantly during curing of the coating, nor was there any significant flow of the coating onto any of the bonding pad or test probe areas.

Evaluation Procedure B

The flow properties of the coating composition were also evaluated by applying the composition on to an aluminum panel as a 1.3 mm-thick coating using a drawdown bar. A trough was then formed by drawing a microspatula across the coating, after which time the coated panel was allowed to remain undisturbed for 15 minutes under ambient conditions. The coatings were then cured by heating the coated panels for one hour at 125° C., followed by one hour at 190° C. and one hour at 250° C. The percentage of the initial trough remaining in the cured material was rated in accordance with the following scale: 1=90-100%; 2=75-90%; 3=50-75%; 4=0-50%.

One of the four coating compositions evaluated contained the same types and amounts of ingredients listed in the first part of this example, including thixotropic agent C1, and the other three contained a different copolymer as the thixotropic agent (ingredient C). Two of these copolymers, identified as C2 and C3, contained pendant polyoxypropylene units and corresponded to the foregoing Formula I where x and y had the values reported in the following table. The third copolymer (C4) corresponded to Formula II where the value of w was 13.

TABLE 1

| Thixotropic Agent | x | y | Thixotropy of Curable Composition | Trough Area Remaining Following Curing |
|---|---|---|---|---|
| C1 | 70 | 3 | fair | 2 |
| C2 | 3 | 6 | very good | 1 |
| C3 | 0 | 2-5 | fair | 2 |
| C4 | — | — | good | 3 |

EXAMPLE 2 (COMPARATIVE EXAMPLE)

This example demonstrates the absence of thixotropy in coating compositions wherein the organosiloxane copolymer (Ingredient C) of the present compositions is replaced with a hydroxyl terminated polydimethylsiloxane or a dimethylsiloxane/oxyethylene copolymer.

Curable coating compositions were prepared using the same types and amounts of ingredients listed in the foregoing example 1, with the exception that the thixotropic agent (ingredient C) was replaced with an equal weight of one of the following materials:

C'1—a hydroxyl endblocked polydimethylsiloxane fluid having a viscosity of about 0.04 Pa.s and containing about 4 weight percent of silicon-bonded hydroxyl groups.

C'2—a liquid trimethylsiloxy terminated organosiloxane copolymer containing an average of 8.6 dimethylsiloxane units and 3.6 units of the formula MeQ'SiO per molecule where Q represents

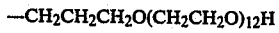
—CH$_2$CH$_2$CH$_2$O(CH$_2$CH$_2$O)$_{12}$H

C'3—a copolymer corresponding to the average formula

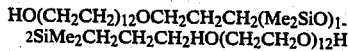
HO(CH$_2$CH$_2$)$_{12}$OCH$_2$CH$_2$CH$_2$(Me$_2$SiO)$_{1.2}$SiMe$_2$CH$_2$CH$_2$CH$_2$HO(CH$_2$CH$_2$O)$_{12}$H All of these compositions flowed sufficiently to fill in the trough that had been formed using the microspatula.

That which is claimed is:

1. A thixotropic, screen printable coating composition comprising
   A. 100 parts by weight of a solubilized curable organosiloxane copolymer comprising methyl-substituted siloxane units, phenyl-substituted siloxane units and silanol groups, where said copolymer has a degree of substitution of at least 1.3;
   B. from 3 to 20 parts by weight of a finely divided silica filler;
   C. as the thixotropic agent, from 1 to 6 parts by weight of a liquid organosiloxane copolymer represented by the average general formula

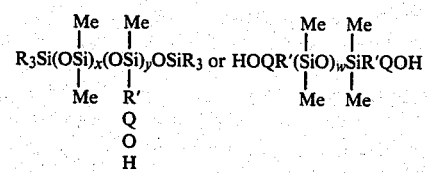

where Me represents methyl; R represents at least one member selected from the group consisting of an alkyl radical containing from 1 to 10 carbon atoms, a halogenated alkyl radical containing from 1 to 10 carbon atoms and a phenyl radical; R' represents an alkylene radical containing from 3 to 10 carbon atoms, Q represents —[OCH$_2$CH(CH$_3$)]$_z$—, x is zero or a positive integer, w and y are at least 1; neither the value of w nor the sum of x and y exceed the value beyond which said copolymer is a solid at 25 degrees C., the units containing a Q substituent constitute from 2 to 80 percent of the total number of units in said copolymer and the value of z is from 2 to 30, inclusive;
   D. an amount of a silanol condensation catalyst sufficient to cure said composition; and
   E. from 10 to 30 parts by weight of a compatible solvent for said composition, said solvent having a boiling point of from 180 to 300 degrees C.

2. A composition according to claim 1 where at least 50 mole percent of the R radicals are methyl and any remainder are at least one of phenyl and 3,3,3-trifluoropropyl, the sum of x and y and the value of w are from 5 to 100, z is from 2 to 10, inclusive, the units containing a Q substituent constitute from 3 to 70 mole percent of the total number of units in said liquid copolymer, the concentration of said liquid copolymer is from 1 to 5 parts by weight per 100 parts by weight of said solubilized copolymer, said solubilized copolymer contains at least 20 mole percent of dimethylsiloxane units, phenylmethylsiloxane units or a combination thereof, from 20 to 40 mole percent of mono- and diphenylsiloxane units or a combination thereof, at least 0.5 weight percent of unreacted silanol groups, has a degree of substitution of from 1.3 to about 1.5, and said solvent is a mono-or diether of a glycol or a mixed ether/ester of a glycol.

3. A composition according to claim 2 where all of the R radicals are methyl, R' is propylene, from 15 to 25 mole percent of said phenyl-containing siloxane units are diphenylsiloxane, the silanol group content of said solubilized copolymer from 1 to 3 percent by weight, the silica content of said composition is from 5 to 10 parts by weight, said catalyst is a carboxylic acid salt of a Group II metal and said glycol is ethylene glycol or a condensation product thereof.

4. A composition according to claim 3 where x is from 0 to 3, inclusive, y is from 2 to 6, inclusive, w is from 2 to 20, inclusive, z is from 2 to 5, inclusive, the catalyst is zinc octoate and the solvent is the acetic acid ester of the monobutyl ether of diethylene glycol.

* * * * *